US012693520B2

(12) United States Patent
Tang et al.

(10) Patent No.: US 12,693,520 B2
(45) Date of Patent: Jul. 28, 2026

(54) USING FORCE SENSING TO PREVENT BORESCOPE DAMAGE

(71) Applicant: Baker Hughes Holdings LLC, Houston, TX (US)

(72) Inventors: Andrew Tang, Camillus, NY (US); James Delmonico, Baldwinsville, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 166 days.

(21) Appl. No.: 18/483,346

(22) Filed: Oct. 9, 2023

(65) Prior Publication Data

US 2025/0116855 A1 Apr. 10, 2025

(51) Int. Cl.
| | |
|---|---|
| *G02B 23/24* | (2006.01) |
| *G01L 5/04* | (2006.01) |
| *G01L 5/10* | (2020.01) |
| *G01N 21/954* | (2006.01) |

(52) U.S. Cl.
CPC .......... *G02B 23/2476* (2013.01); *G01L 5/047* (2013.01); *G01L 5/10* (2013.01); *G01N 21/954* (2013.01); *G01N 2021/9546* (2013.01)

(58) Field of Classification Search
None
See application file for complete search history.

(56) References Cited

U.S. PATENT DOCUMENTS

| | | | |
|---|---|---|---|
| 4,787,369 A | 11/1988 | Allred, III et al. | |
| 11,300,480 B2 | 4/2022 | Tang et al. | |
| 2014/0139831 A1 | 5/2014 | Gutschow et al. | |
| 2015/0319410 A1* | 11/2015 | Gu ....................... | G01N 21/954 |
| | | | 348/82 |

(Continued)

FOREIGN PATENT DOCUMENTS

| | | |
|---|---|---|
| CN | 103868541 A | 6/2014 |
| CN | 216351526 U | 4/2022 |

(Continued)

OTHER PUBLICATIONS

International Search Report, mailed Jan. 17, 2025, International Patent Application No. PCT/US2024/049365, filed Oct. 1, 2024.

(Continued)

*Primary Examiner* — Heather R Jones
(74) *Attorney, Agent, or Firm* — Mintz, Levin, Cohn, Ferris, Glovsky and Popeo, P.C.

(57) ABSTRACT

A borescope includes an inspection tube with the following features. The inspection tube includes an actuable portion nearer a distal of the inspection tube than a proximal end of the tube. Actuatable drive cables extend a length of the inspection tube. The actuable drive cables are attached to a distal end of the inspection tube and are arranged to transfer motion to the actuable portion. A force sensor is coupled to each of the actuable drive cables. An inspection head is attached to the distal end of the inspection tube. The control unit is configured to receive a signal from the force sensor. The signal is indicative of stress within the actuable drive (Continued)

cables. The controller is configured to actuate the actuable drive cables to provide slack in response to the signal indicating stress within the actuable drive cables exceeding a specified threshold.

18 Claims, 14 Drawing Sheets

(56) References Cited

U.S. PATENT DOCUMENTS

| | | |
|---|---|---|
| 2019/0295139 A1 | 9/2019 | Soorianarayanan et al. |
| 2021/0213628 A1 | 7/2021 | Tang et al. |
| 2022/0163427 A1* | 5/2022 | Tang .................. G01M 5/0091 |
| 2022/0197009 A1 | 6/2022 | Williams et al. |
| 2024/0033484 A1* | 2/2024 | Gomes ................. A61M 25/01 |

FOREIGN PATENT DOCUMENTS

| | | |
|---|---|---|
| EP | 4012658 A1 | 6/2022 |
| JP | 2004065320 A | 3/2004 |
| WO | WO-2022165302 A1 | 8/2022 |

OTHER PUBLICATIONS

Everest XLG3 Video Probe System, GE Inspection Technologies XLG3 Video Probe System, 2009.

* cited by examiner

402

410

402

404

406

502

504

504a

504b

514

*800*

Receiving a signal from a force sensor coupled to actuable drive cables within a borescope — *802*

Determining that a stress within the actuable drive cable has exceeded a specified threshold — *804*

Actuating the actuable drive cables — *806*

USING FORCE SENSING TO PREVENT BORESCOPE DAMAGE

TECHNICAL FIELD

The subject matter described herein relates to borescope systems.

BACKGROUND

Video inspection devices, such as video endoscopes or borescopes, can be used to take depth measurements on an object (e.g., lowest points in anomalies such as pits or dents, heights of welds, measurements of offsets or clearances between surfaces, etc.). Additionally, video inspection devices can be used to observe defects (e.g., tears, cracks, scratches, etc.) on a surface of an object (e.g., an industrial machine). In many instances, the surface of the object is inaccessible and cannot be viewed without the use of the video inspection device. For example, a video inspection device can be used to inspect the surface of a blade of a turbine engine on an aircraft or power generation unit to identify any anomalies to determine if any repair or further maintenance is required. In order to make that assessment, it is often necessary to obtain highly accurate-dimensional measurements of the surface to verify that the anomaly does not fall outside an operational limit or required specification for that object.

SUMMARY

This disclosure relates to using force sensing to prevent borescope damage.

A borescope includes an inspection tube with the following features. The inspection tube includes an actuable portion nearer a distal of the inspection tube than a proximal end of the tube. Actuatable drive cables extend a length of the inspection tube. The actuable drive cables are attached to a distal end of the inspection tube and are arranged to transfer motion to the actuable portion. A force sensor is coupled to each of the actuable drive cables. An inspection head is attached to the distal end of the inspection tube. A control unit is at a proximal end of the inspection tube. The control unit is configured to receive a signal from the force sensor. The signal is indicative of stress within the actuable drive cables. The control unit can include a processor and a non-transient memory comprising instructions executable by the processor to actuate the actuable drive cables to provide slack in response to the signal indicating stress within the actuable drive cables exceeding a specified threshold. The actuable drive cables are actuated such that the inspection head is moved to a straight-ahead position.

In some embodiments, the actuators can be coupled to proximal ends of the actuable drive cables. The actuators can be configured to move the actuable drive cables responsive to signals received from the control unit.

In some embodiments, the inspection tube can be a first removable inspection tube, the actuable portion can be a first actuable portion, the drive cables can be a first set of drive cables, the force sensor can be a first force sensor, and the specified threshold can be a first specified threshold. The borescope can then also include a second removable inspection tube having a different size or length than the first removable inspection tube. The second removable inspection tube can include a second actuable portion nearer a distal of the second inspection tube than a proximal end of the second inspection tube. A second set of actuatable drive cables can extend a length of the second inspection tube. The second set of actuable drive cables can be attached to a distal end of the second inspection tube. The second set of actuable drive cables can be arranged to transfer motion to the second actuable portion. A second force sensor can be coupled to each of the second set of actuable drive cables. The controller can be configured to actuate the second set of actuable drive cables in response to the signal indicating stress within the actuable drive cables is above a specified threshold different than the first specified threshold.

In operation, the controller can receive a signal from the force sensor coupled to actuable drive cables within the borescope. The controller can, in some embodiments and/or instances, determine that a stress within the actuable drive cable has exceeded a specified threshold based on the signal. The controller can then, in some embodiments, actuate the actuable drive cables to provide slack such that an inspection head is moved to a straight-ahead position.

In some embodiments, actuating the actuable drive cables can include sending a signal to one or more actuators. The actuators can be adjusted responsive to the signal. A drive cable, coupled to an actuator at a first end of the drive cable and to the inspection head at a second end of the drive cable, can be adjusted by the actuator. In some embodiments and/or instances, the actuable drive cables can be actuated by the actuators such that the inspection head is moved to face a substantially upward direction.

In some embodiments, the controller can be configured to provide a warning to a user prior to actuating the actuable drive cables.

In some embodiments, a fiber optic cable can extend through an inner passage defined by the inspection tube. The fiber optic cable can extend between the inspection head and the control unit. Communication cables can also extend through the inner passage between the inspection head and the control unit.

In some embodiments, the force sensor can include a piezoelectric force sensor. Alternatively or in addition, the force sensor can include a strain gauge, a force sensitive resistor, a drive current sensor, or a torque sensor. Regardless of the type of force sensor used, the force sensor can extend between an actuator bracket and a housing of the borescope.

BRIEF DESCRIPTION OF DRAWINGS

These and other features will be more readily understood from the following detailed description taken in conjunction with the accompanying drawings.

DESCRIPTION

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

Figure 1:
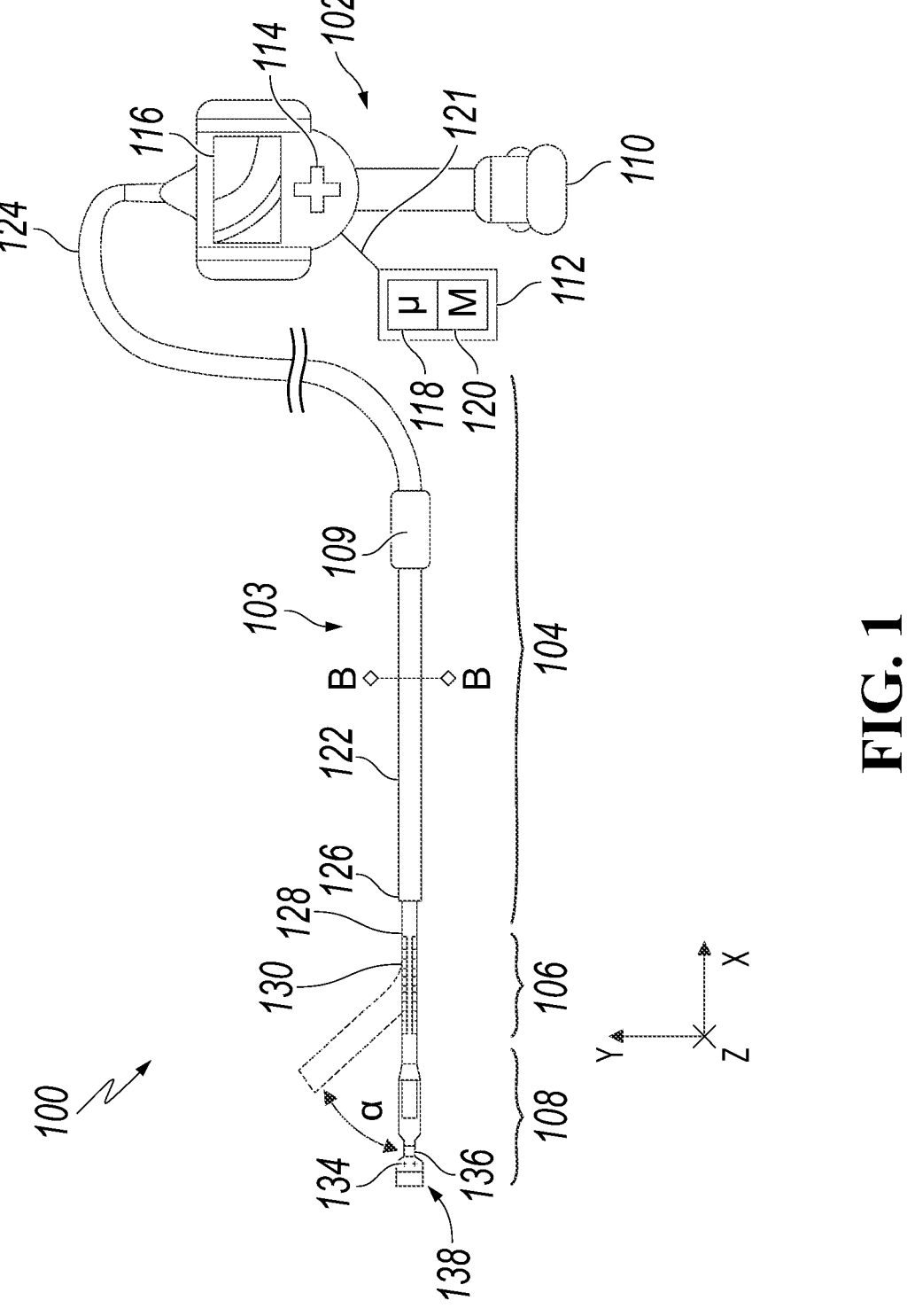
FIG. 1 is a schematic diagram of an example borescope.

FIG. 1 is a diagram illustrating an exemplary embodiment of an inspection device (e.g., a non-destructive device) in the form of a borescope 100. The borescope 100 can include a control unit 102 and an inspection tube 103. The inspection tube 103 can include a conduit section 104, a bendable, actuable articulation portion or section 106, and an inspection head 108. In one embodiment, the sections 104, 106, 108 can have different lengths and can be integral with one another, or can be detachable from one another. As depicted, the conduit section 104 is suitable for insertion into a variety of different targets, such as inside turbomachinery, equipment, pipes, conduits, underwater locations, curves, bends, inside or outside of an aircraft system, and the like.

The borescope 100 can include a probe driver 109 coupled to the conduit section 104. The probe driver 109 can include actuators (not shown) configured to translate and/or rotate one or more of the sections 104, 106, 108 (e.g., to facilitate insertion of the inspection head 108 into the target). Additionally or alternatively, orientation/position of a portion of the inspection head 108 (e.g., camera, light source, etc.) can be varied to acquire an inspection region image (e.g., RGB image, IR image, etc.). The control unit 102 can include a control unit housing 110, a controller 112, a directional input 114, and a screen 116. The controller 112 can include a processor 118 and a readable memory 120 containing computer readable instructions which can be executed by the processor 118 in order to actuate the borescope 100. The computer readable instructions can include an inspection plan based on which the borescope 100 or a portion thereof (e.g., a conduit section 104, a bendable articulation section 106, and an inspection head 108) can be translated/rotated (e.g., by the probe driver 109). In some implementations, the operation of the probe driver 109 can be based on a control signal (e.g., generated by the controller 204 based on the inspection plan/user input via GUI display space on screen 116 or a computing device, etc.).

The controller 112 can be communicatively coupled to the control unit 102 via one or more cables 121. The controller 112 can also be arranged within the control unit housing 110, or can be arranged outside the control unit housing 110. On some implementations, the directional input 114 can be configured to receive user input (e.g., direction controls) to the control unit 102 for actuation of the borescope 100. The screen 116 can display visual information being received by the camera (including an optical sensor) arranged in the inspection head 108, which can allow the user to better guide the borescope 100 using the directional input 114. The directional input 114 and the screen 116 can be communicatively coupled to the controller 112 via the one or more cables 121, which can be a hard-wired connection or a wireless signal, such as WI-FI or Bluetooth. In one implementation, inspection data and/or notifications (e.g., notifications based on inspection data as described above) can be provided on the screen 116. More details on the controller 112 are described later in this disclosure.

The conduit section 104 can include a tubular housing 122 including a proximal end 124 and a distal end 126. The tubular housing 122 can be a flexible member along its whole length, or can be rigid at the proximal end 124 and become more flexible travelling down the length of the conduit section 104 towards the distal end 126. In certain embodiments, the tubular housing 122 can be formed from a non-porous material to prevent contaminants from entering the borescope 100 via the conduit section 104.

The control unit 102 can be arranged at the proximal end 124 of the tubular housing 122, and the bendable articulation section 106 can be arranged at the distal end of the tubular housing 122. The bendable articulation section 106 can include a bendable neck 128 and washers 130. The bendable neck 128 can be arranged at the distal end 126 of the tubular housing 122, and is able to be actuated 360° in the Y-Z plane. The bendable neck 128 can be wrapped in a non-porous material to prevent contaminants from entering the borescope 100 via the bendable articulation section 106.

The inspection head 108 can include a light source 134 (e.g., LEDs or a fiber optic bundle with lights at the proximal end), a camera 136 (or multiple cameras such as visible-light camera, IR camera, etc.), and one or more sensors 138 that can be configured to collect data about the surrounding environment. Details about example sensors 138 are described later within this disclosure. The camera 136 of the borescope 100 can provide images and video suitable for inspection to the screen 116 of the control unit 102. The light source 134 can be used to provide for illumination when the inspection head 108 is disposed in locations having low light or no light. The sensor 138 can record data including temperature data, distance data, clearance data (e.g., distance between a rotating element and a stationary element), flow data, and so on.

In certain embodiments, the borescope 100 includes one or more replacement inspection heads 108. The inspection head 108 can include tips having differing optical characteristics, such as focal length, stereoscopic views, 3-dimensional (3D) phase views, shadow views, etc. Additionally or alternatively, the inspection head 108 can include a removable and replaceable portion of the inspection head 108. Accordingly, the head sections 108, bendable necks 128, and conduit section 104 can be provided at a variety of diameters from approximately one millimeter to ten millimeters or more.

During use, the bendable articulation section 106 and the probe driver 109 can be controlled, for example, by the control inputs (e.g., relative control gestures, physical manipulation device) from the directional input 114 and/or control signals generated by the controller 112. The directional input can be a joystick, D-pad, touch pad, trackball, optical sensor, or a touchscreen over the screen 116. The directional input 114 can also be a similar device that is located outside the control unit housing 110 and connected by wire or wireless means. In particular, a set of control inputs can be used to control the bendable articulation section 106 and/or the probe driver 109. The bendable articulation section 106 can steer or "bend" in various dimensions, while the conduit section 104 can translate and/or rotate, using any combination of actuators and wires arranged within the control unit 102, to adjust the orientation (e.g., a positioning) of the inspection head 108. In some implementations, the control inputs/direction input 114 can be generated by the controller based on an inspection plan.

The actuators can be electric, pneumatic, or ultrasonically operated motors or solenoids, shape alloy, electroactive polymers, dielectric elastomers, polymer muscle material, or other materials. For example, the bendable articulation section 106 and the probe driver 109 can enable movement of the inspection head 108 in an X-Y plane, X-Z plane, and/or Y-Z plane. Indeed, the directional input 114 can be used to perform control actions suitable for disposing the inspection head 108 at a variety of angles, such as the depicted angle α. In this manner, the inspection head 108 can be positioned to visually inspect desired locations.

Once the inspection head 108 is in a desired position, the camera 136 can operate to acquire, for example, a stand-still visual image or a continuous visual image, which can be displayed on the screen 116 of the control unit 102, and can be recorded by the borescope 100. In embodiments, the screen 116 can be multi-touch touch screens using capacitance techniques, resistive techniques, infrared grid techniques, and the like, to detect the touch of a stylus and/or one or more human fingers. Additionally or alternatively, acquired visual images can be transmitted into a separate storage device for later reference.

In some embodiments, the inspection tube 103 can be removable and interchangeable, for example, with inspection tubes of different lengths, materials, or diameters.

Figure 2:
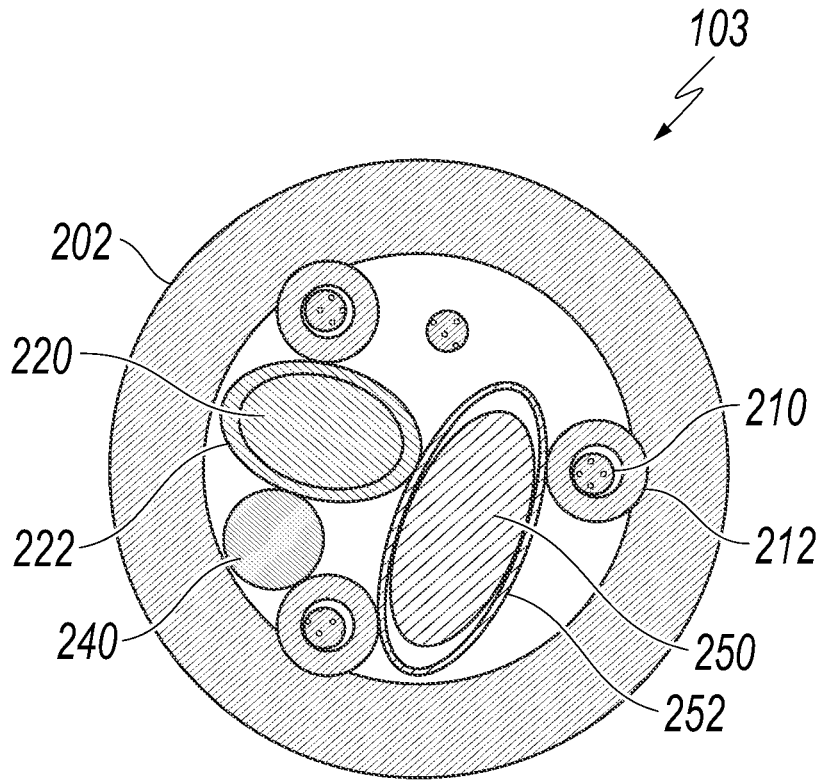
FIG. 2 is a cross sectional view of an inspection tube of the borescope.

FIG. 2 illustrates a cross-sectional view taken along axis B-B of FIG. 1. As shown in FIG. 2, the inspection tube 103 can include a first conduit 202 housing a communication cable 220 having communication cable jacket 222, actuable drive cables 210 for articulating the sensor articulation assembly and having sheaths 212, a phase-measure (PM) contact harness 240, a fiber optic cable 250 having a jacket 252. Each of the communication cable 220, the sheathed actuable drive cables 210, the phase-measure (PM) contact harness 240 and the fiber optic cable 250 can be configured to extend from the borescope control unit 102 through the inspection tube 103 and terminate at the sensing head 108. In some embodiments, the conduit 202 can be made from a stainless steel monocoil, a polyurethane jacket, a tungsten braid, and/or a polyurethane coating.

The communication cable 220 can be configured to connect, for example, a camera in the sensor within the inspection head 108 to the electronics of the control unit 102 in order to produce an image. In some embodiments, the jacket 222 can be made from Teflon.

The sheathed actuable drive cables 210 can be arranged to articulate the articulation section 106. The drive cables 210 can connect the sensing head 108 to a sensing end actuator within the borescope control unit 102. In some embodiments, the actuators within the driver 109 can include one or more cams or reels that the drive cables 210 can be wound around. The driver can be controlled by a controller 112 within the borescope control unit 102. The controller 112 can provide control signals to the sensing end actuator to cause the drive cables 210 to be wound around the cams/reels. By winding the drive cables 210 around their respective cam/reel more or less than others, a user can produce different levels of tension within the actuable section 106 and cause bending of the articulating section 106 in a controlled articulation manner. In some embodiments, the drive cables 210 can be made from tungsten. Additionally, in some embodiments, the cable sheaths 212 can be made from stainless steel. While the illustrated embodiment illustrates three actuable drive cables 210, other counts of actuable drive cables can be used without departing from this disclosure, for example, two or four actuable drive cables can be used.

The fiber optic cable 250 can be configured to transmit information in the form of light, from the sensor 138 on the sensing head 108 to a computing system of the borescope control unit 102. In some embodiments, the fiber optic cable jacket 252 can be made from a PVC or similar material.

Figure 3:
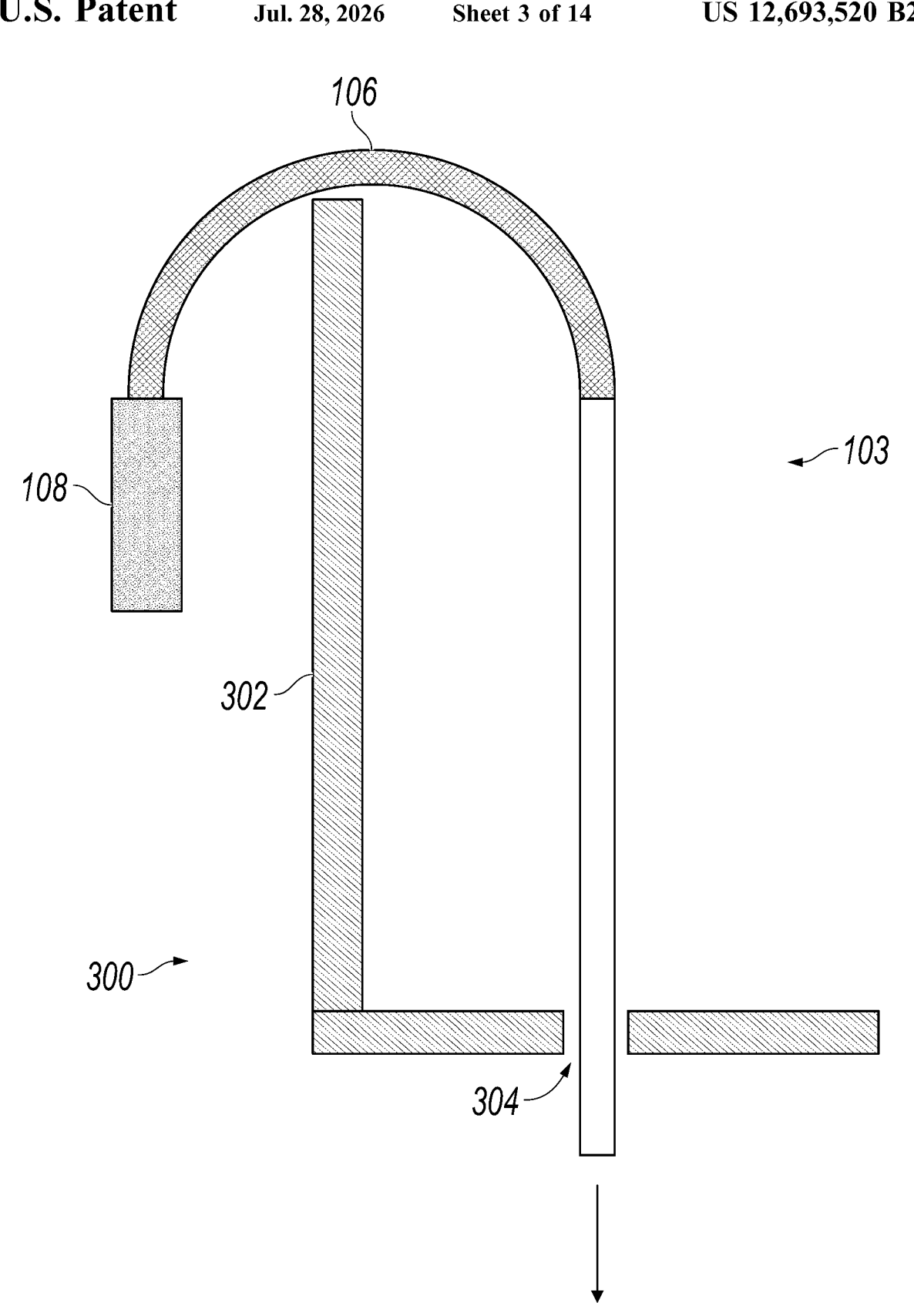
FIG. 3 is a schematic diagram of inspection tube being used during an inspection.
Figure 4A:
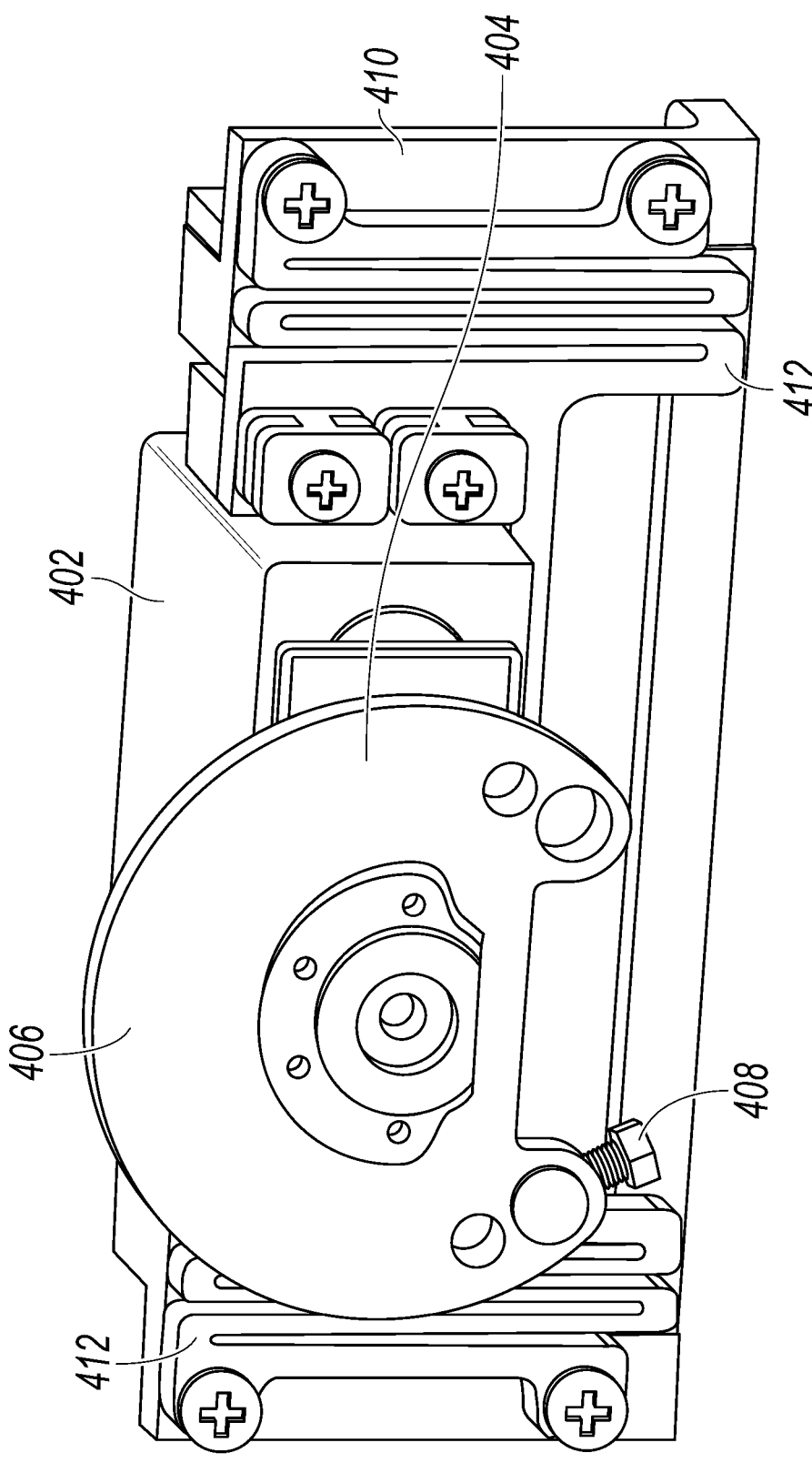
FIGS. 4A-4G illustrate views of an example driver mounted on a flexible bracket coupled to a piezoelectric device.
Figure 4B:
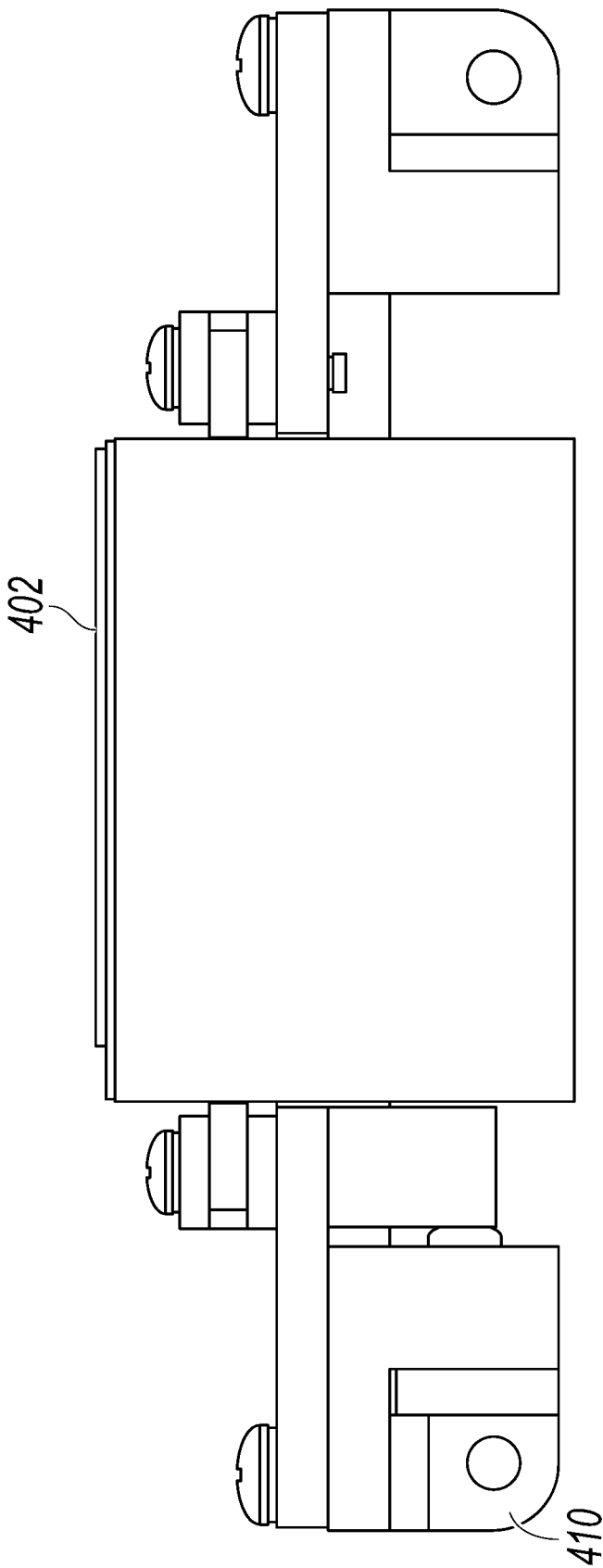
Figure 4C:
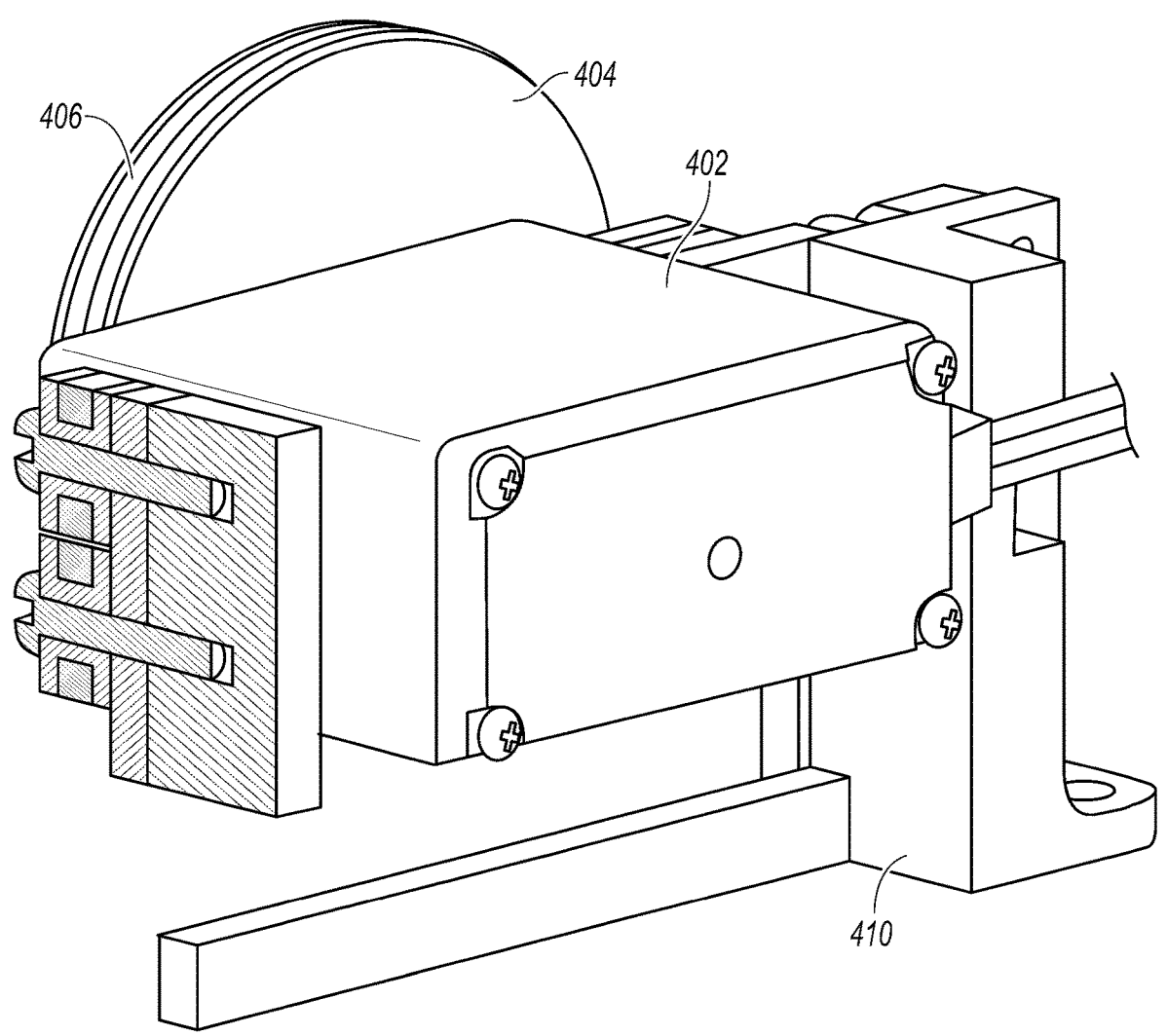
Figure 4D:
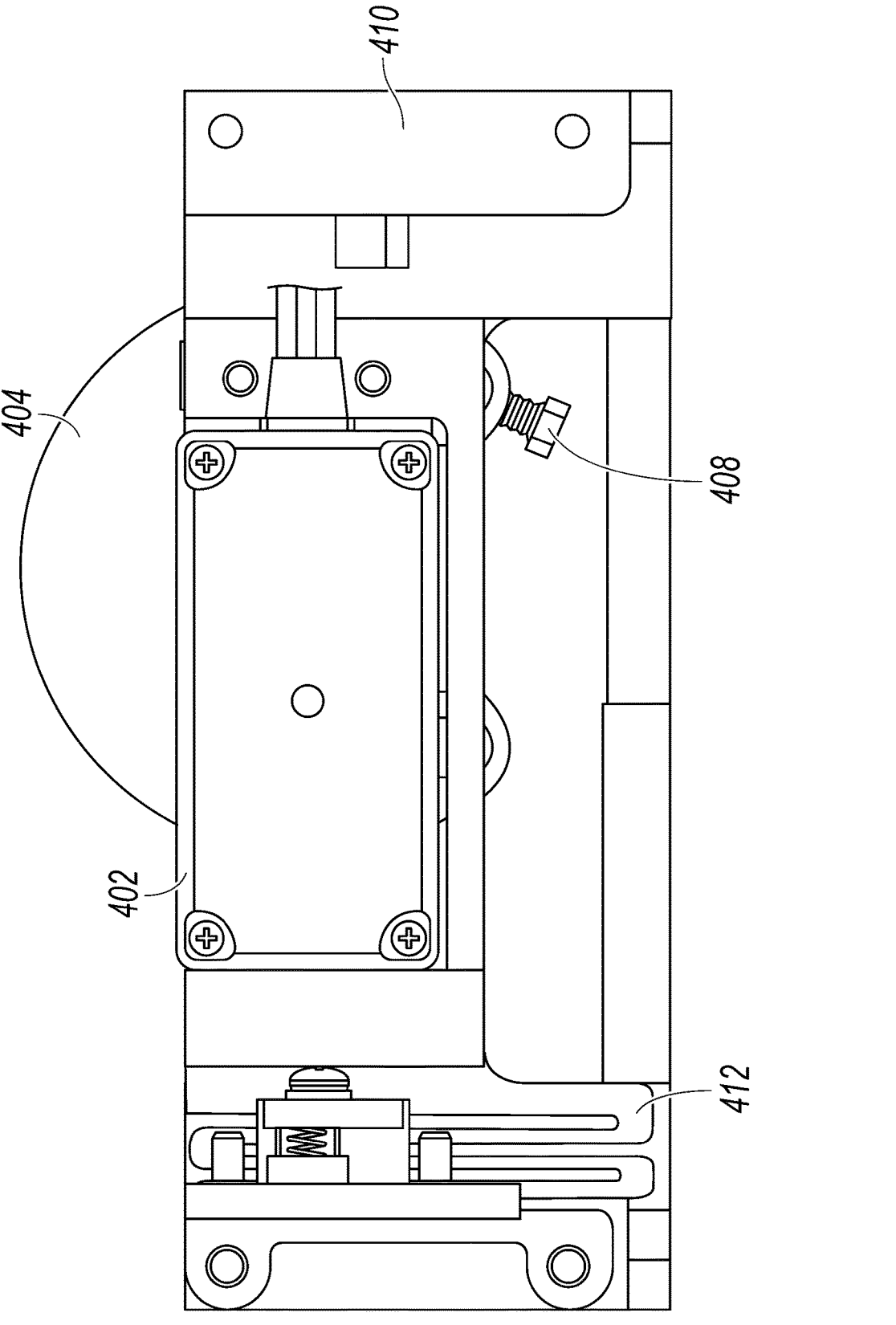
Figure 4E:
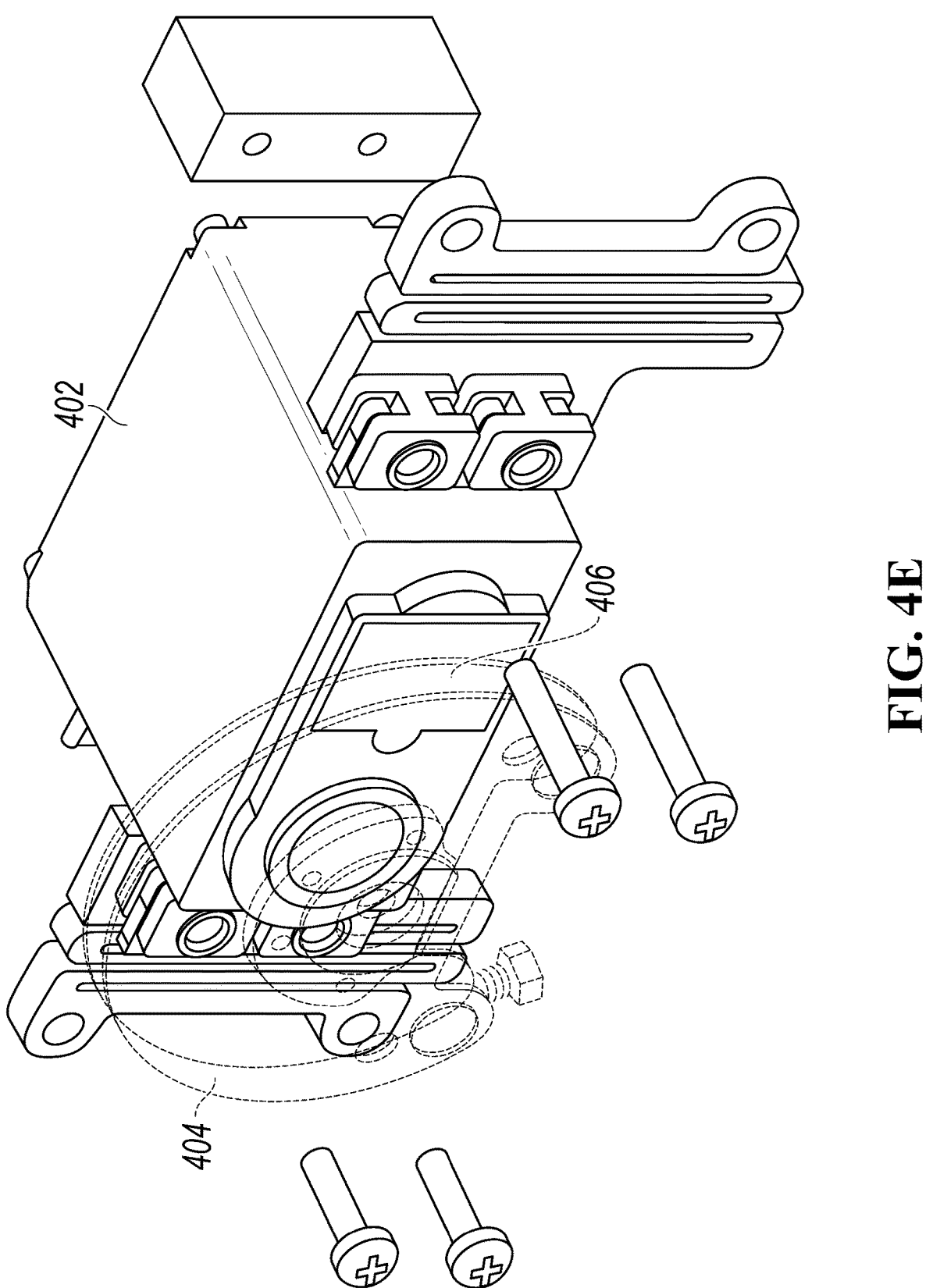
Figure 4F:
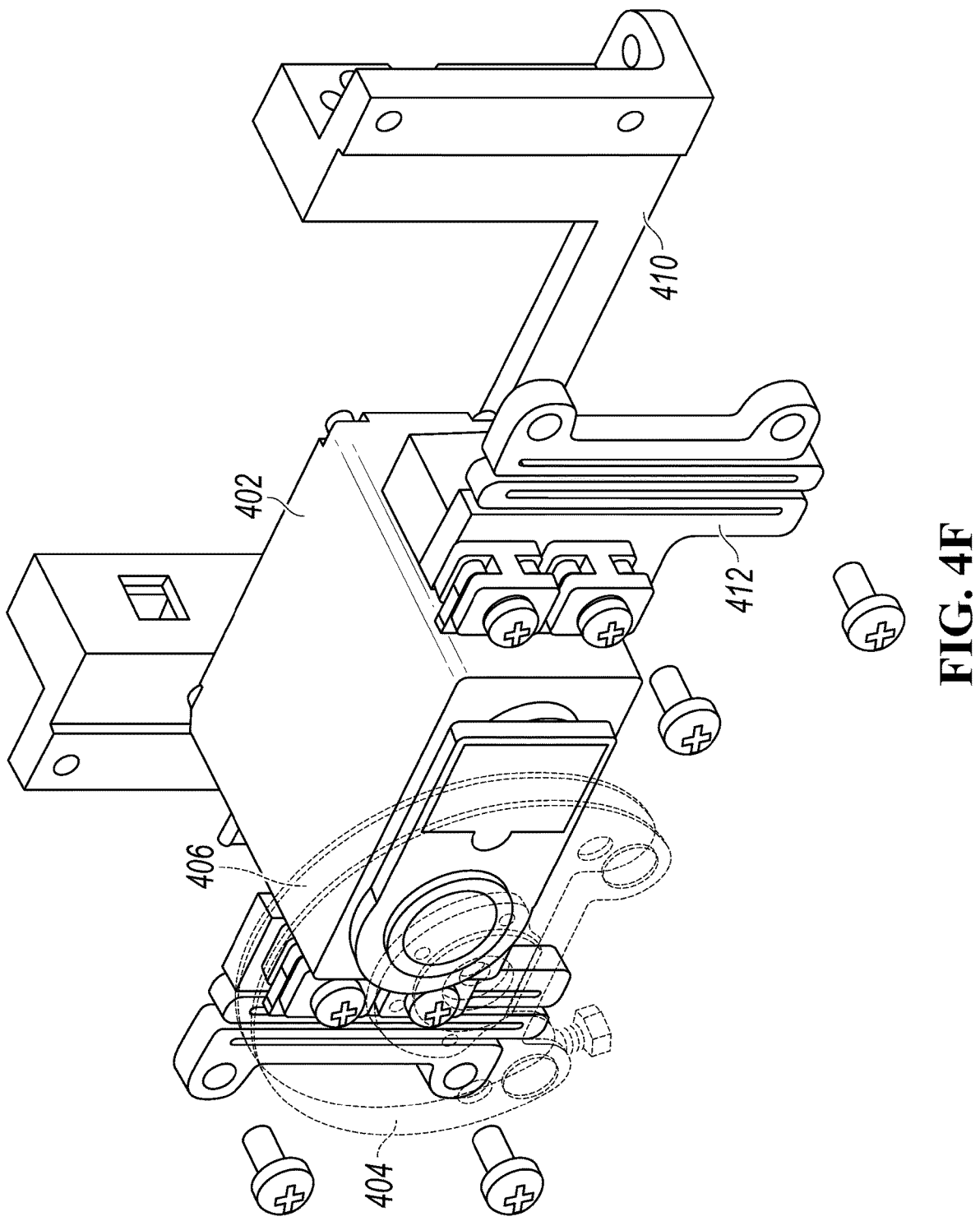
Figure 4G:
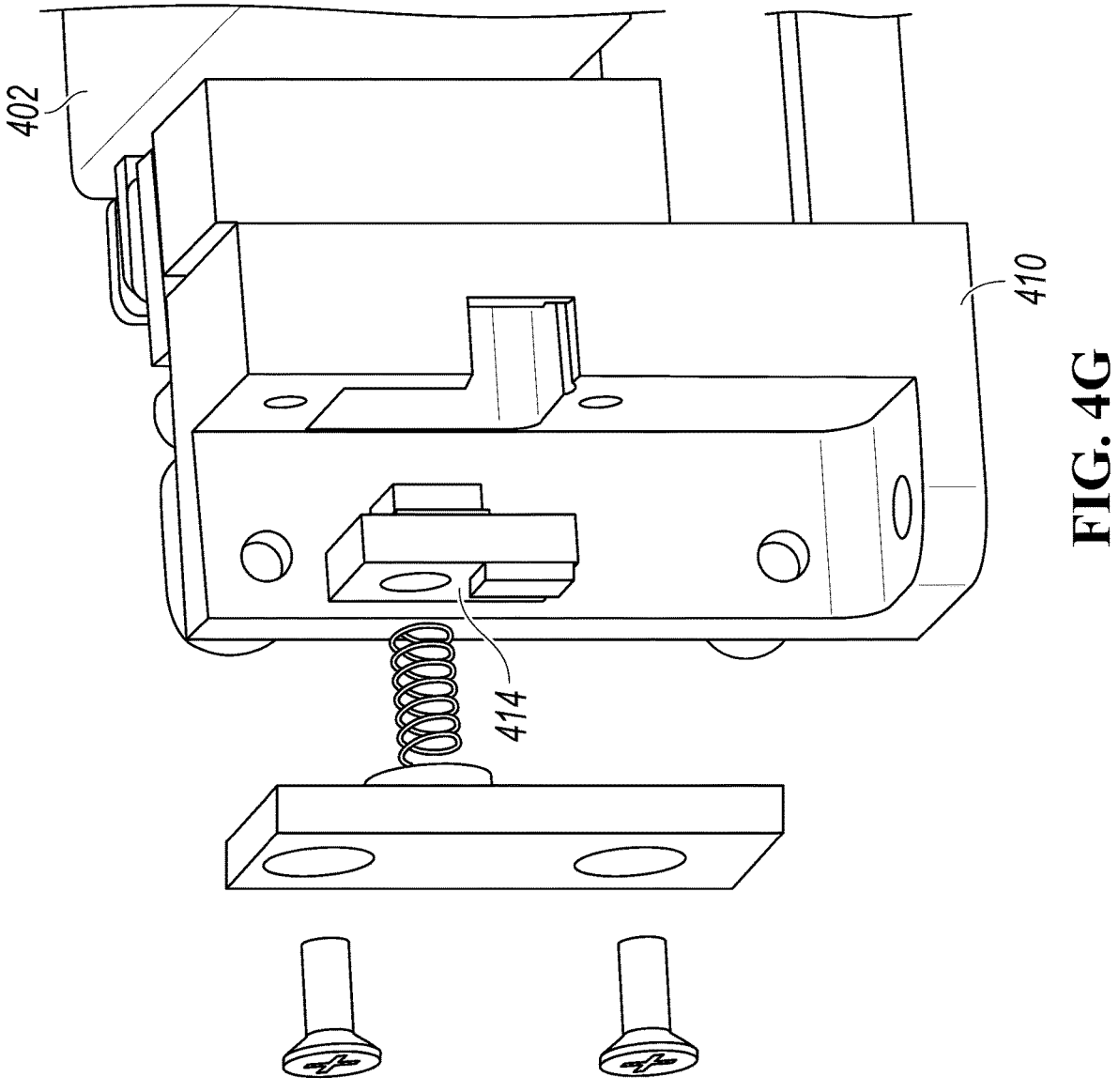

During inspection operations the section 106 can be used to bend the inspection head 108 around a corner to observe one or more items on the other side of an obstruction, such as a wall 302 shown in FIG. 3. In such a situation, the wall 302 acts as an interference when the inspection tube 103 is pulled from the system being inspected. Such a situation can cause stress or damage to the inspection tube 103. To prevent such damage, sensors coupled to the drive cables 210 can measure the tension of the actuator cables 210, and the section 106 can be relaxed in response to determining that a pre-determined stress has been exceeded. Such a threshold can be a value at which the inspection tube is likely (greater than 50% chance) to be damaged by the stress. The actuation allows the inspection tube 103 to be pulled from the system 300 without damage. When the actuator cables 210 are relaxed, the inspection head 108 defaults to a "straight ahead" position, and the flexible section 106 remains pliable. The combination of pliability and position allow the inspection head 108 and inspection tube 103 to more easily be withdrawn from an inspection port 304 without damage or with less damage than when the actuator cables 210 are not relaxed.

As previously discussed, inspection tubes 103 can be removable and interchangeable with different properties, such as diameter and length. As such, different inspection tubes 103 can have different stress threshold values at which the actuator cables 210 are relaxed.

In some implementations, the driver 109 can include one or more servos similar to the servo 402 shown in FIGS. 4A-4G. The servo 402 is arranged to rotate a cam 404. An edge of the cam 404 defines a groove 406 configured to receive an end of a drive cable 210. The drive cable 210 can be secured to the cam 404 with a fixing screw 408. The servo can be mounted to a rigid bracket 410 that is rigid relative to a fixed point, such as a wall of the housing 110 or a wall of a driver module 109. In some implementations, the servo 402 is mounted to the rigid bracket 410 by one or more flex brackets 412. The flex brackets 412 allow the servo 402 to move the cam 404 relative to the rigid bracket 410 based on a tension of the drive cable 210. This freedom of movement allows for force to be transferred, for example, to a piezoelectric sensor 414, to be measured and analyzed by the controller 112. While primarily illustrated and described as using a piezoelectric sensor as the force sensor, other sensors can be used without departing from this disclosure, for example, a strain gauge, a force sensitive resistor, a drive current sensor, or a torque sensor can be used. Alternatively or in addition, for pneumatic or hydraulic actuators, pressure sensors can be used.

Figure 5:
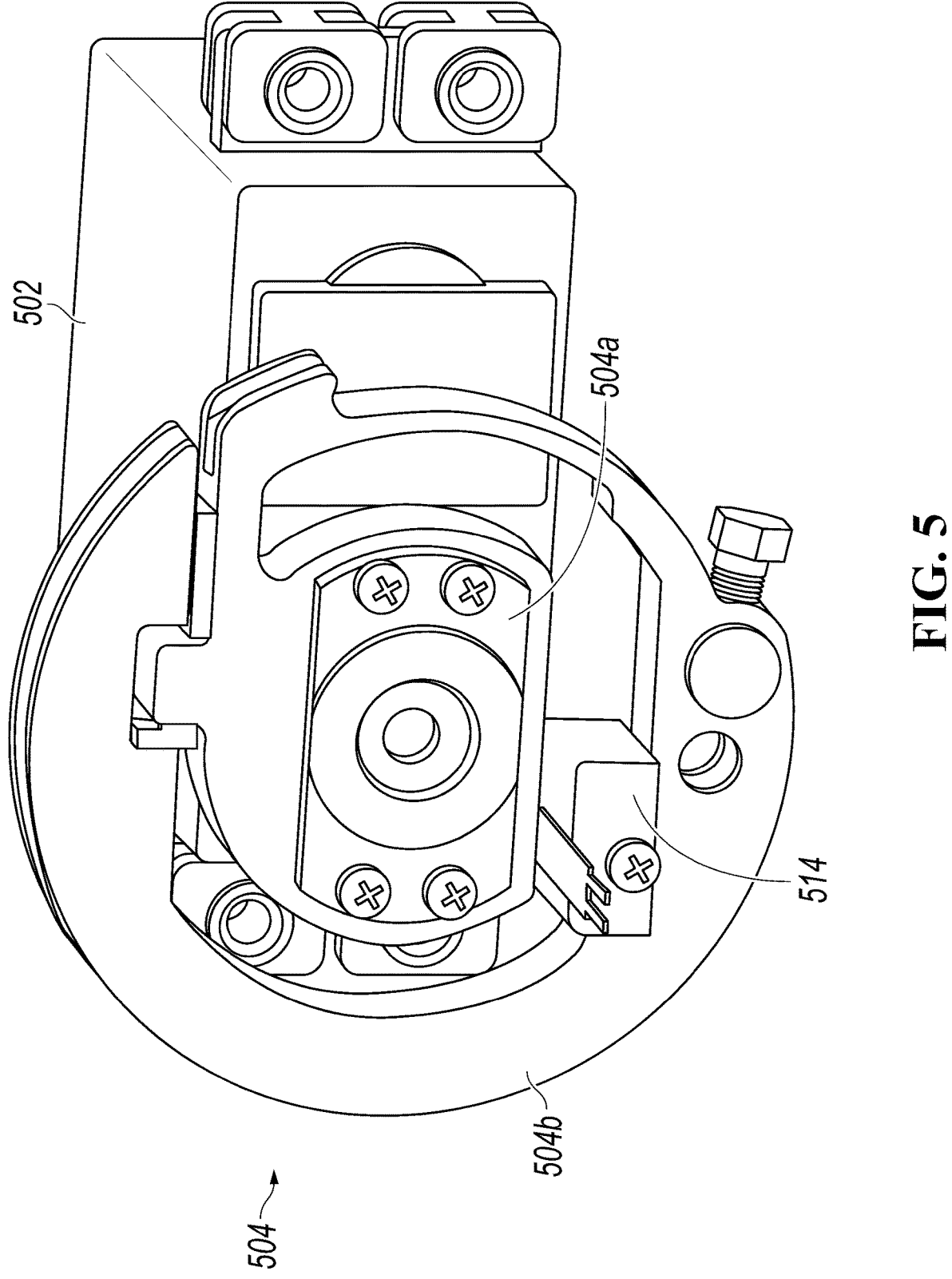
FIG. 5 is an example driver with a flexible rotating cam.

Alternatively or in addition, as shown in FIG. 5, a cam 504 can define a flexible section 504*b* that flexes based on tension within a drive cable 210. The servo 502 is substantially similar to the servo 402 previously described with the exception of any differenced described herein. The flexible cam 504, in some implementations, can include a sensor 514, such as a piezoelectric sensor, between the flexible section 504*b* and a rigid portion 504*a* of the cam 504. As such, any force imparted on the sensor 514 by the flexible section 504*b* moving relative to the rigid portion 504*a* can be measured and analyzed by the controller 112. Systems with the flexible cam 504 do not need the flex brackets 412 previously described; however, such systems can be used in combination, for example, to further verify sensor or measurement accuracy.

Figure 6:
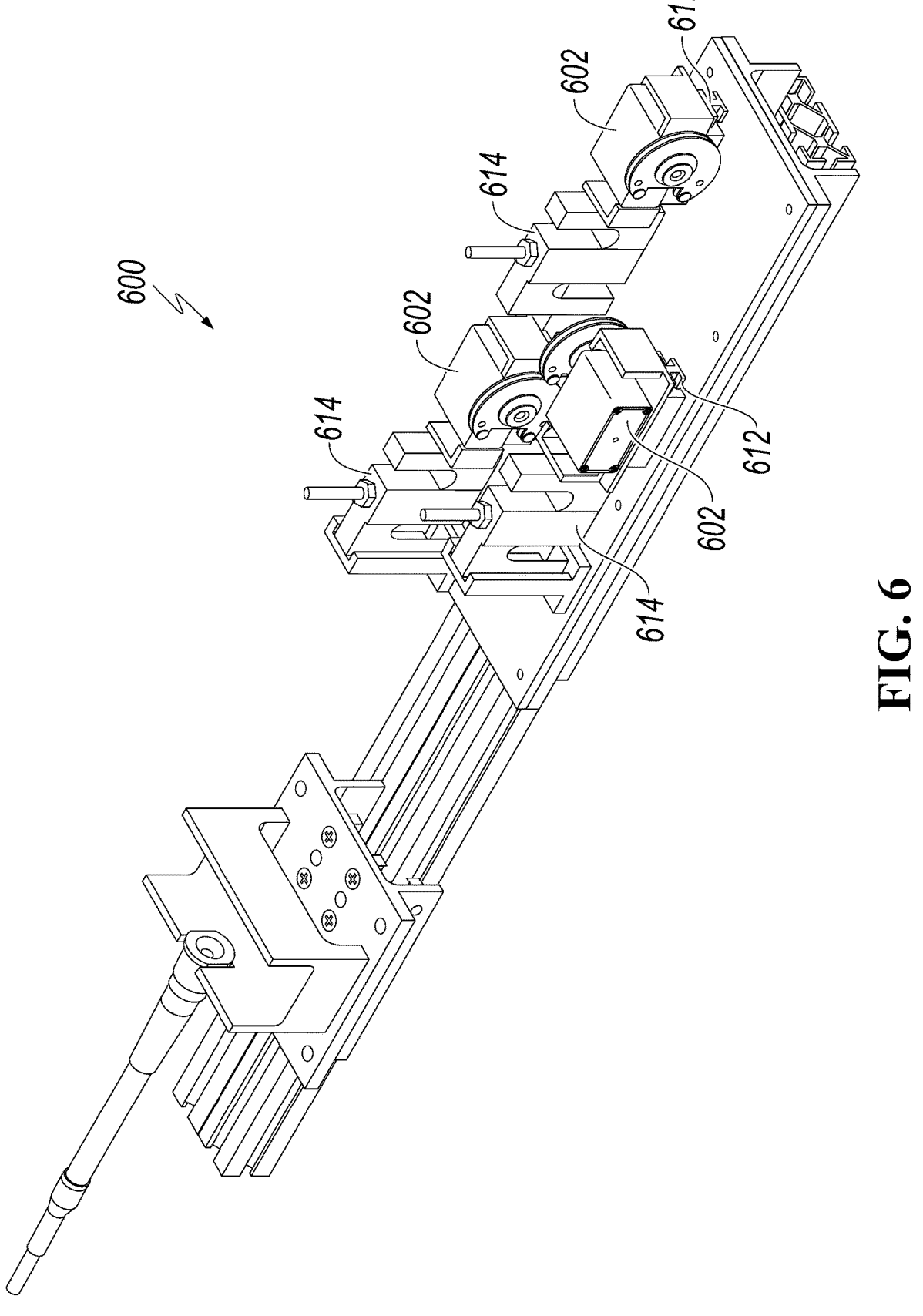
FIG. 6 is a table-top demonstration of drivers coupled to load cells.

While primarily described and illustrated as using piezoelectric sensors to determine actuator cable tension, other sensors, such as load cells can be used without departing from this disclosure. An example bench-top set-up 600, Shown in FIG. 6, illustrates such a system that uses load-cells 614. In such a system, the servos 602 are mounted on rails 612, allowing freedom of movement to impart force onto load-cells 614. The servos 602 are substantially similar to the servo 402 previously described with the exception of any differenced described herein. With the inclusion of the rails 612 and load-cells 614, flexible brackets 412 and/or flexible cams 504 are not necessary; however, such systems can be combined without departing from this disclosure, for example, to verify sensor or measurement accuracy.

Figure 7:
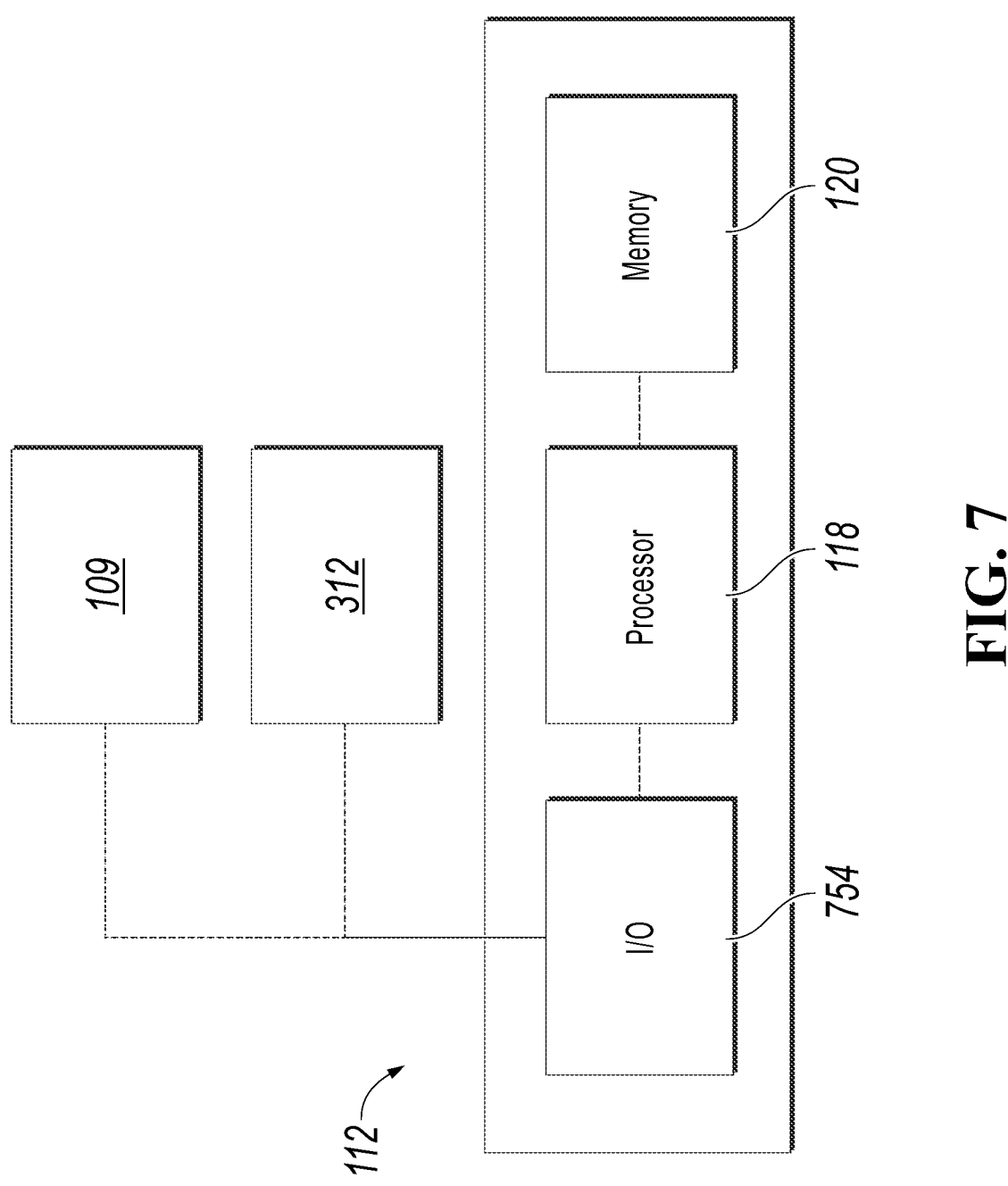
FIG. 7 is a block diagram of an example controller that can be used with aspects of this disclosure.

FIG. 7 illustrates the example controller 112 that can be used with some aspects of the current subject matter. For example, in some embodiments, the controller can execute all or part of the method 800 described later within this disclosure. The controller 112 can, among other things, monitor parameters of a system, send signals to actuate and/or adjust various operating parameters of such systems. As shown in FIG. 7, the controller 112 can include one or more processors 118 and non-transitory computer readable memory storage (e.g., memory 120) containing instructions that cause the processors 118 to perform operations. The processors 118 are coupled to an input/output (I/O) interface 754 for sending and receiving communications with components in the system, including, for example, the driver 109. In certain instances, the controller 112 can additionally communicate status with and send actuation and/or control signals to one or more of the various system components (including, for example, a light source) of the system, as well as other sensors (e.g., pressure sensors, temperature sensors, vibration sensors and other types of sensors) that provide signals to the system.

The controller 112 can be implemented with various levels of autonomy. For example, in some instances, the controller 112 determines a stress within one or more of the drive cables exceeds a pre-set threshold, and sends signals to the actuators within the driver 109 to provide slack in the cables and move the inspection head 108 into a straight-ahead position with no input from the operator. Alternatively or in addition, the controller 112 can determine a stress within one or more of the drive cables exceeds a pre-set threshold, and inform an operator that the threshold has been exceeded. The operator can then act on the warning or choose to ignore the warning. The operator can act on the warning, for example, by providing a user input directing the controller 112 to control the driver 109 to provide slack in the cables and move the inspection head 108 into a straight-ahead position.

Figure 8:
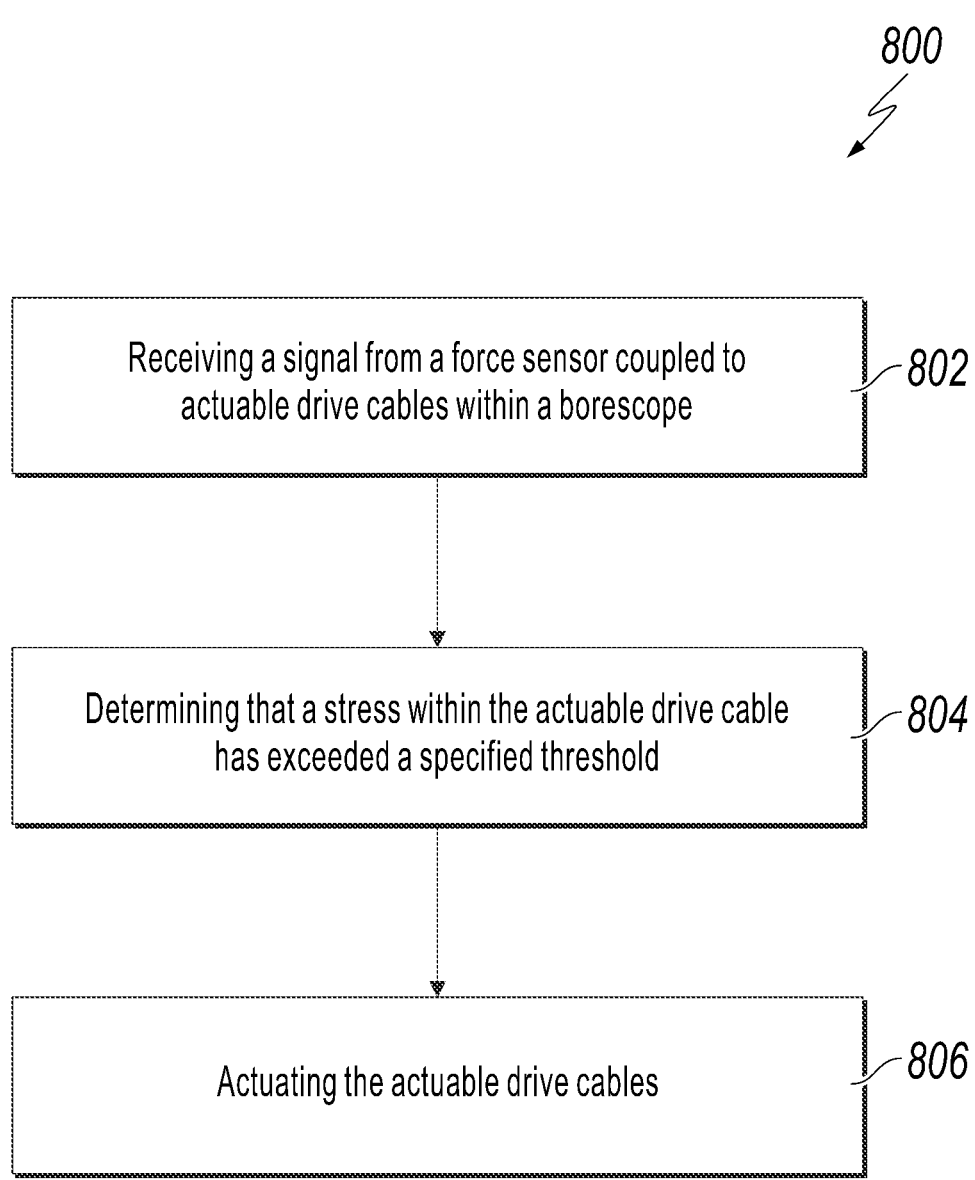
FIG. 8 is a flowchart of a method that can be used with aspects of this disclosure.

The method 800 shown in FIG. 8 can be used with aspects of this disclosure. In some embodiments, all or part of the method 800 can be performed by the controller 112. At 802 a signal from a force sensor coupled to actuable drive cables within a borescope is received. The signal is indicative of stress within the actuable drive cables.

At 804, a stress within the actuable drive cable is determined to have exceeded a specified threshold based on the signal. In some implementations, a warning can be provided to a user at this point. The user can, in some embodiments, turn off any automation that may occur as a result of the subject matter described herein. Such an override can be used, for example, to rotate a compressor section using the inspection tube 103 during a gas-turbine inspection.

At 806, the actuable drive cables are actuated to provide slack such that an inspection head is moved to a straight-ahead position. Such movement can be done, in some embodiments, by sending a signal to the one or more actuators within the driver 109. The actuators can then be adjusted responsive to the signal. The drive cables 210, coupled to respective actuators within the driver 109 at a first end of each drive cable 210 and to the inspection head 108 at a second end of each drive cable 210, can then be adjusted by the actuators within the driver 109. The result is the inspection head being moved to a relaxed, straight-ahead position that allows the flexible section 106 to bend as needed in response to outside forces or interferences.

In some embodiments, actuating the actuable drive cables can include sending a signal to one or more actuators, for example, servo 402, 502, or 602. The actuators can then be adjusted responsive to the signal. A drive cable, coupled to an actuator at a first end of the drive cable and to the inspection head at a second end of the drive cable, is then adjusted by the actuator.

While this disclosure contains many specific embodiment details, these should not be construed as limitations on the scope of what may be claimed, but rather as descriptions of features specific to particular embodiments. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

Other embodiments can be within the scope of the following claims.

What is claimed is:

1. A borescope comprising:
a first inspection tube and a second inspection tube configured to be used interchangeably with the borescope system, wherein the second inspection tube has a different size or length than the first inspection tube, and wherein each of the first and second inspection tubes comprise:
an actuable portion nearer a distal of the inspection tube than a proximal end of the tube, and
actuatable drive cables extending a length of the inspection tube, the actuable drive cables attached to a distal end of the inspection tube, the actuable drive cables arranged to transfer motion to the actuable portion; and
a force sensor coupled to each of the actuable drive cables, the force sensor configured to measure tension within each of the actuable drive cables;
an inspection head attachable to the distal end of the first inspection tube or the second inspection tube; and
a control unit attachable to a proximal end of the first inspection tube or the second inspection tube, the control unit configured to:
receive a signal from the force sensor of the first inspection tube or the second inspection tube, the signal being indicative of tension within the actuable drive cables of the first inspection tube or the second inspection tube; and
actuate the actuable drive cables of the first inspection tube or the second inspection tube to provide slack in response to the signal indicating stress within the actuable drive cables of the first inspection tube or the second inspection tube exceeding either a first specified threshold when the first inspection tube is being used or a second specified threshold when the second inspection tube is being used.

2. The borescope of claim 1, wherein the force sensor of each of the first and second inspection tubes comprises a piezoelectric force sensor.

3. The borescope of claim 1, wherein the force sensor of each of the first and second inspection tubes comprises a strain gauge, a force sensitive resistor, a drive current sensor, or a torque sensor.

4. The borescope of claim 1, wherein the force sensor of the first inspection tube extends between an actuator bracket and a housing of the borescope when the first inspection tube is being used, and wherein the force sensor of the second inspection tube extends between the actuator bracket and the housing of the borescope when the second inspection tube is being used.

5. The borescope of claim 1, wherein each of the first and second inspection tubes further comprise:
a fiber optic cable extending through an inner passage defined by the inspection tube, the fiber optic cable extending between the inspection head and the control unit; and
communication cables extending through the inner passage, the communication cables extending between the inspection head and the control unit.

6. The borescope of claim 1, further comprising first actuators coupled to proximal ends of the actuable drive cables of the first inspection tube and second actuators coupled to proximal ends of the actuable drive cables of the second inspection tube, the first actuators configured to move the actuable drive cables responsive to signals received from the control unit when the first inspection tube is being used, and the second actuators configured to move the actuable drive cables of the second inspection tube responsive to signals received from the control unit when the second inspection tube is being used.

7. The borescope of claim 1, wherein the controller is further configured to provide a warning to a user prior to actuating the actuable drive cables of either the first inspection tube or the second inspection tube.

8. A method comprising:
interchangeably coupling one of a first inspection tube or a second inspection tube to a borescope system, wherein the second inspection tube has a different size or length than the first inspection tube;
receiving a signal from a force sensor coupled to actuable drive cables within the first inspection tube or the second inspection tube, the signal being indicative of tension within the actuable drive cables of the first inspection tube or the second inspection tube;
determining that a tension within one or more of the actuable drive cables of the first inspection tube has exceeded a first specified threshold based on the signal when the first inspection tube is being used, or determining that a tension within one or more of the actuable drive cables of the second inspection tube has exceeded a second specified threshold based on the signal when the second inspection tube is being used; and
actuating the actuable drive cables of the first inspection tube or the second inspection tube to provide slack such that an inspection head of the borescope is moved to a straight-ahead position.

9. The method of claim 8, wherein actuating the actuable drive cables of either the first inspection tube or the second inspection tube comprises:
sending a signal to one or more actuators;
adjusting the actuators responsive to the signal; and
adjusting a drive cable, coupled to an actuator at a first end of the drive cable and to the inspection head at a second end of the drive cable, by the actuator.

10. The method of claim 8, further comprising providing a warning to a user prior to actuating the actuable drive cables of the first inspection tube or the second inspection tube.

11. A borescope comprising:
a first inspection tube and a second inspection tube configured to be used interchangeably with the borescope system, wherein the second inspection tube has a different size or length than the first inspection tube, and wherein each of the first and second inspection tubes comprise:
an actuable portion nearer a distal of the inspection tube than a proximal end of the tube, and
actuatable drive cables extending a length of the inspection tube, the actuable drive cables attached to a distal end of the inspection tube, the actuable drive cables arranged to transfer motion to the actuable portion;
a force sensor coupled to each of the actuable drive cables, the force sensor configured to measure tension within each of the actuable drive cables;
an inspection head attachable to the distal end of the first inspection tube or the second inspection tube; and a control unit attachable to a proximal end of the first inspection tube or the second inspection tube, the control unit comprising:

a processor; and a non-transient memory comprising instructions executable by the processor to:

receive a signal from the force sensor of the first inspection tube or the second inspection tube, the signal being indicative of tension within the actuable drive cables of the first inspection tube or the second inspection tube; and actuate the actuable drive cables of the first inspection tube or the second inspection tube to provide slack in response to the signal indicating tension within the actuable drive cables of the first inspection tube or the second inspection tube exceeding either a first specified threshold when the first inspection tube is being used or a second specified threshold when the second inspection tube is being used, the actuable drive cables being actuated such that the inspection head is moved to a straight-ahead position.

12. The borescope of claim 11, wherein the force sensor of each of the first and second inspection tubes comprises a piezoelectric force sensor.

13. The borescope of claim 11, wherein the force sensor of each of the first and second inspection tubes comprises a strain gauge, a force sensitive resistor, a drive current sensor, or a torque sensor.

14. The borescope of claim 11, wherein each of the first and second inspection tubes further comprises:

a fiber optic cable extending through an inner passage defined by the inspection tube, the fiber optic cable extending between the inspection head and the control unit; and communication cables extending through the inner passage, the communication cables extending between the inspection head and the control unit.

15. The borescope of claim 11, further comprising first actuators coupled to proximal ends of the actuable drive cables of the first inspection tube and second actuators coupled to proximal ends of the actuable drive cables of the second inspection tube, the first actuators configured to move the actuable drive cables of the first inspection tube responsive to signals received from the control unit when the first inspection tube is being used, and the second actuators configured to move the actuable drive cables of the second inspection tube responsive to signals received from the control unit when the second inspection tube is being used.

16. The borescope of claim 15, wherein the memory further comprises instructions executable by the processor to:

actuate the actuable drive cables, by the actuators of the first inspection tube when the first inspection tube is being used, such that the inspection head is moved to face a substantially upward direction; or actuate the actuable drive cables, by the actuators of the second inspection tube when the second inspection tube is being used, such that the inspection head is moved to face the substantially upward direction.

17. The borescope of claim 11, wherein the force sensor of the first inspection tube extends between an actuator bracket and a housing of the borescope when the first inspection tube is being used, and wherein the force sensor of the second inspection tube extends between the actuator bracket and the housing of the borescope when the second inspection tube is being used.

18. The borescope of claim 11, wherein the memory further comprises instructions executable by the processor to provide a warning to a user prior to actuating the actuable drive cables of either the first inspection tube or the second inspection tube.

* * * * *